(No Model.)
A. B HENDRYX.
FISHING REEL.
No. 351,598. Patented Oct. 26, 1886.
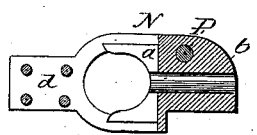
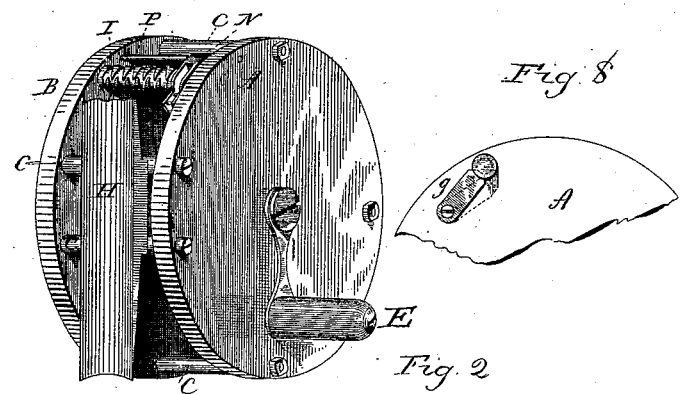
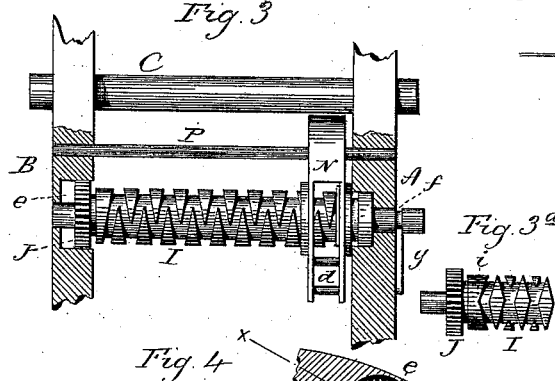
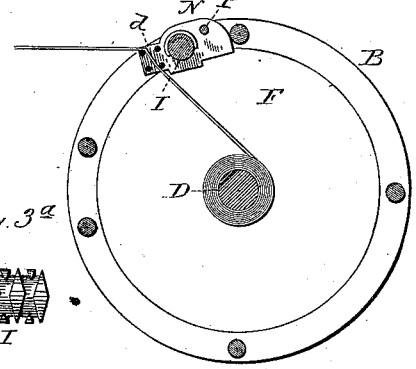
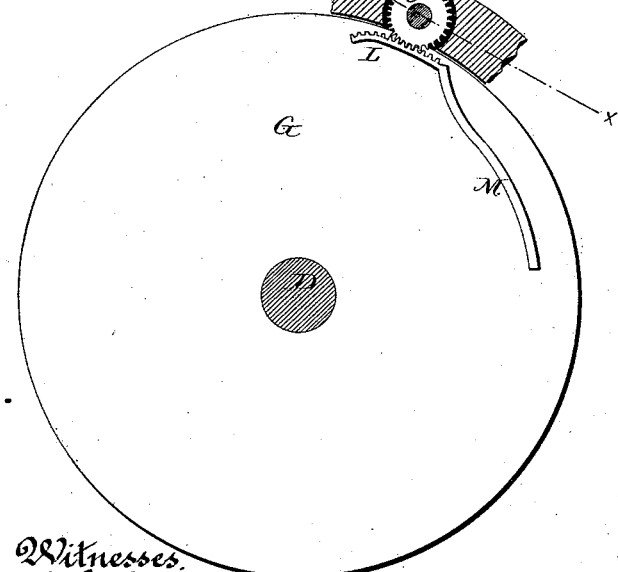
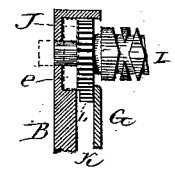
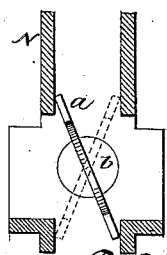
Witnesses.
Andrew B. Hendryx, Inventor.
By Atty.

UNITED STATES PATENT OFFICE.

ANDREW B. HENDRYX, OF NEW HAVEN, CONNECTICUT.

FISHING-REEL.

SPECIFICATION forming part of Letters Patent No. 351,598, dated October 26, 1886.

Application filed June 28, 1886. Serial No. 206,450. (No model.)

*To all whom it may concern:*

Be it known that I, ANDREW B. HENDRYX, of New Haven, in the county of New Haven and State of Connecticut, have invented a new Improvement in Fishing-Reels; and I do hereby declare the following, when taken in connection with accompanying drawings and the letters of reference marked thereon, to be a full, clear, and exact description of the same, and which said drawings constitute part of this specification, and represent, in—

Figure 1, a perspective view; Fig. 2, a transverse section through the spool, showing the inside of one head of the spool and side view of the guide; Fig. 3, a transverse section cutting on line $xx$ of Fig. 4, enlarged; Fig. 3ª, a side view of the shaft, enlarged, turned one-fourth from the position seen in Fig. 3; Fig. 4, a transverse section showing the outside of one head with the rack thereon engaging the pinion on the shaft, enlarged; Fig. 5, a vertical section through the portion of the head and spool, showing side view of the shaft, pinion, and rack, enlarged; Fig. 6, a longitudinal section of the guide, enlarged; Fig. 7, a vertical section showing engaging end view of the dog, still further enlarged; Fig. 8, an outside view of one head, showing the dog for securing the shaft in its engaged position.

This invention relates to an improvement in that class of fishing-reels which are of a spool-like form arranged on an axle between two heads, the said heads connected by posts to form the frame for the support of the spool, and the spool revolved by a crank upon the outside of one of the heads, and particularly to that class in which a guide is arranged for the line and adapted to traverse a two-way spirally-grooved shaft arranged to revolve in an axis parallel with the axis of the spool, and whereby the guide is moved from one end of the spool to the other and returned to properly lay the line, the object being to make an automatic engagement between the guide and the spirally-grooved shaft, whereby all liability to interruption in the proper working of the guide is avoided.

A represents one head; B, the other head, connected by posts C. Between the two heads the spool is arranged in the usual manner, D representing the axle, which takes a bearing in each head, and, extending through one, is provided upon the outside with a crank, E, by which the spool may be revolved to wind the line.

F, Fig. 2, represents one head of the spool, and G, Fig. 4, the other head. The body of the reel is provided with the usual securing-plate, H. So far the construction is common and well known.

Transversely between the two heads, and so as to take a bearing in each, is a shaft, I, (see Fig. 3,) the shaft free to revolve in its respective bearings, and its axis should be substantially parallel with that of the axis of the spool. This shaft is double screw-threaded, as seen in Fig. 3—that is, one thread running to the right and the other to the left. To this shaft an intermittent rotation is imparted through a pinion, J, at the end of the shaft and in one of the heads—say B—and so as to come into a plane outside the head G of the spool, as seen in Fig. 5. The head B is recessed, and so as to leave a space, K, between the head G, of the spool and the inside face of the head B.

On the outside of the head G is a toothed segment, L, corresponding to the pinion J of the shaft I, and this segment is preferably formed on the end of a spring, M, secured to the outside of the head G, as seen in Fig. 4, and so that the segment or rack L will revolve with the head G, and at each revolution of the spool will impart to the shaft I a corresponding extent of revolution. If the teeth of the rack be the same number as the teeth of the pinion, then each revolution of the spool will impart one revolution to the shaft I. On the shaft I the guide N is arranged, also supported on a bar, P, parallel to the shaft I, as seen in Fig. 3, so that the slide may move across back and forth between the heads.

On the guide N a dog, $a$, is hung upon an axis at right angles to the axis of the shaft I, as seen in Fig. 6, the said dog being adapted to turn upon its axis in a recess in the guide from one side to the other, as indicated in Fig. 7. The dog extends above and below its own axis, and so as to embrace the shaft upon correspondingly opposite sides. The dog corresponds in thickness to the groove of the screw-thread on the shaft I. When standing at one angle—say as indicated in Fig. 7—the dog corresponds to one thread of the shaft I, and when turned to the other angle, as indicated in broken lines, Fig. 7, it corresponds to the reverse thread; hence the direction in which the guide will travel on the shaft I depends upon in which of the two positions the dog stands. Having started from one and engaged with one thread, it will follow that thread until it arrives at the opposite end, where the two threads terminate, as at *i*, Fig. 3ª, enlarged. When the end of the dog reaches this terminating point *i*, it is turned upon its axis by the reversely-inclined thread until it reaches the plane of that return-thread—the position seen in broken lines, Fig. 7—and engaging that thread, and the shaft continuing its revolution, the guide will return across the shaft to the opposite end, where when the groove terminates and intersects with the first groove the guide will again be turned to its first position and again pass across the opposite side, and so travel back and forth so long as the revolution of the groove is continued, the guide making one step in its intermittent movement at each revolution of the spool.

The guide N is provided with a suitable opening, *d*, though which the line may run, as seen in Fig. 2, and so that as the spool is revolved to wind the line onto the spool it runs through the guide, and because the guide travels from side to side the line will be carried accordingly from side to side and laid regularly back and forth across the spool, and in running off it will be led from the spool in the same manner in which it is wound, the guide traveling by intermittent steps the same as in winding, it being understood that the rack works upon the shaft I as well in one direction as the other. Because of extending the dog upon opposite sides of its own axis and upon corresponding sides of the spirally-grooved shaft, such an engagement is made between the dog and the grooves in the shaft that all possibility of its disarrangement in the grooves to prevent the proper working of the guide is avoided.

In some cases it may be desirable to permit the line to run free and without the guide. To do this the rack and pinion should be disengaged, so as to prevent the rotation of the shaft. This may be done in various ways. A single illustration will be sufficient. The recess in the head in which the pinion J runs is made deeper than the thickness of the pinion, so as to form a recess, *e*, outside the pinion, and so that the shaft may be moved, say, to the left, as indicated in broken lines, Fig. 5, to bring the pinion into the recess and out of the path of the rack. In this case the shaft will be disengaged from the rack, and so that the guide will stand still. Then return the shaft to bring the pinion again into the path of the rack, and the guide will work as before. In this case the shaft should be extended through the opposite head and there provided with a locking device which will hold the shaft in the position of engaging the rack, and this may be done by making an annular groove, *f*, in the end of the shaft and providing a dog, *g*, upon the outside of the head to engage the said groove, as seen in Fig. 8, the dog being adapted to swing into or out of engagement with the shaft, as seen in broken lines, Fig. 8.

I claim—

In a fishing-reel consisting of a spool arranged between two heads of a frame and provided with a crank for rotating the same, the combination therewith of a transverse shaft arranged across between the heads outside of the spool, and substantially parallel with the axis thereof, the said shaft constructed with a double or right and left hand screw-thread on its surface, the guide N, arranged upon said shaft, and adapted to travel on said shaft back and forth between the two heads, the dog *a*, arranged in said guide and upon an axis at right angles to the axis of the shaft, and whereby said dog is permitted to turn and oscillate upon said axis, the said dog extending to the opposite sides of its own axis and upon corresponding sides of the said shaft, substantially as described.

ANDREW B. HENDRYX.

Witnesses:
EDWARD N. PECK,
HARRY E. HENDRYX.